UNITED STATES PATENT OFFICE.

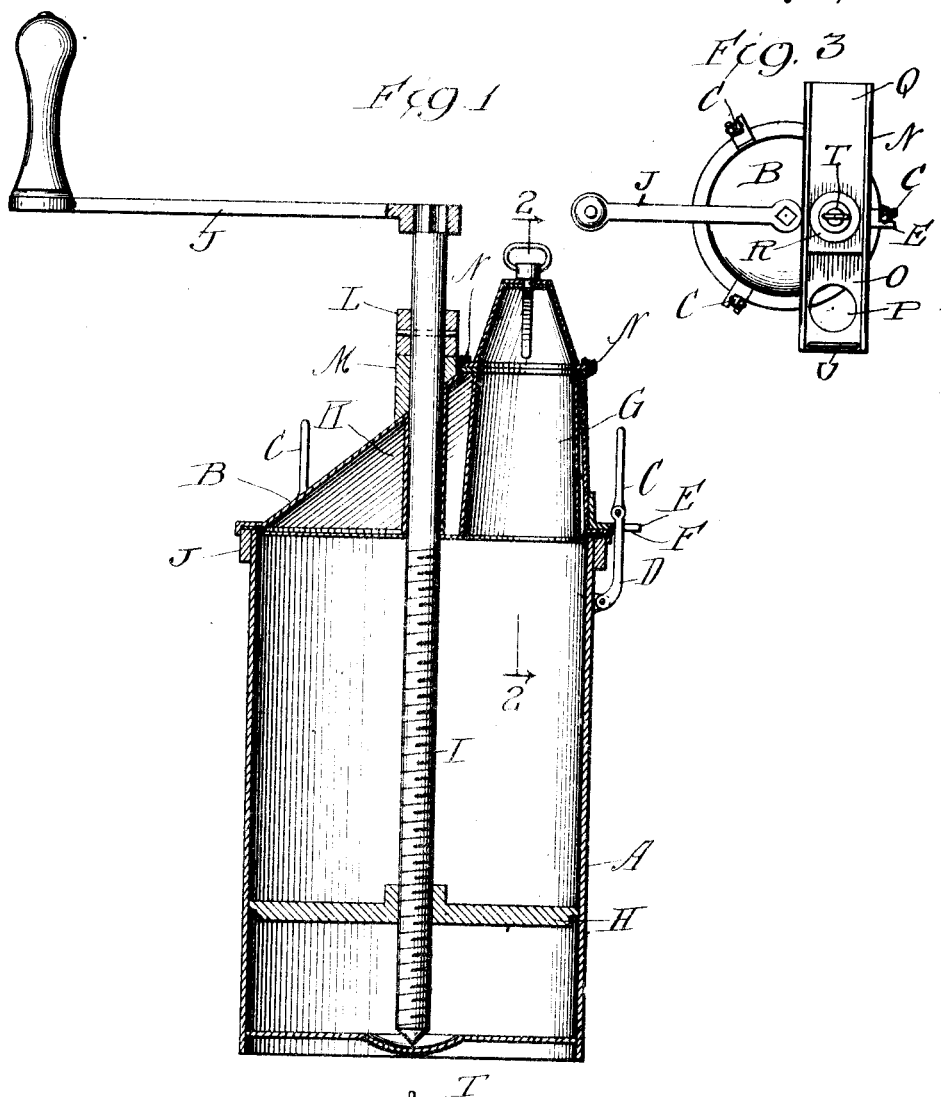

CHARLES DOERING, JR., OF OAK PARK, ILLINOIS.

ICE-CREAM DISPENSER.

1,026,080.  Specification of Letters Patent.  Patented May 14, 1912.

Application filed May 5, 1909, Serial No. 494,165. Renewed October 13, 1911. Serial No. 654,541.

*To all whom it may concern:*

Be it known that I, CHARLES DOERING, Jr., citizen of the United States, residing at Oak Park, in the county of Cook and State of Illinois, have invented certain new and useful Improvements in Ice-Cream Dispensers; and I do hereby declare the following to be a full, clear, and exact description of the invention, such as will enable others skilled in the art to which it appertains to make and use the same.

This invention relates to a novel construction in an apparatus for dispensing ice cream and similar frozen viands, the object being to provide means whereby measured quantities of the same may be easily and rapidly dished and served without contact of the hands therewith and without necessitating opening the receptacle at any time except when substantially entirely empty of its contents, and consists in the features of construction and combinations of parts hereinafter fully described and claimed.

In the accompanying drawings illustrating my invention Figure —1— is a central vertical section of an apparatus constructed in accordance with my invention. Fig. —2— is a detail vertical section on the line 2—2 of Fig. —1—. Fig. —3— is a plan section of the same.

In serving ice cream and the like it is at present customary to remove the cover of the receptacle or can in which it is contained and insert a spoon or ladle or the more generally used cone. If as frequently happens the person serving the cream is extremely busy, especially in hot weather, it often happens that he or she perspires and in leaning over the can or receptacle for the purpose of filling the ladle or cone drops of perspiration from hands or face will drop into the receptacle. Furthermore the frequent opening of the can permits of the possibility of dust and other impurities finding their way into the same, so that present methods are not entirely sanitary or desirable.

The main object of my invention is to provide means whereby the cream may be served from a sealed receptacle without necessitating contact therewith by the hands or the opening of the receptacle from the time that it is filled until it is emptied, and further to provide means whereby the serving of the cream is more quickly and easily effected and waste thereof prevented.

My invention comprises the cylindrical receptacle A provided with a removable cover B which is secured thereon in any suitable manner such for example as the eccentric levers C pivotally disposed upon links D, pivotally secured to the body of the can A and which said links are adapted to be swung into radial slots E in the projections F of the cover, said eccentric levers being adapted to bear upon said projections F on either side of said slots E to draw the cover down tightly upon the receptacle A. Said cover is provided at one side with a tapered delivery spout G through which cream is adapted to be forced by means of the piston H in said receptacle A actuated by the screw shaft I which is adapted to be turned by means of the crank J or other suitable means depending upon the size, (diameter) of the cylinder A, and the consequent load upon the piston and also the resistance to movement of the cream. The said screw shaft I has threaded engagement with the hub of the piston H in a well-known manner, said screw-shaft passing through a central opening in said cover and through a sleeve K extending through the hollow portion of said cover. On said screw-shaft is a collar L which bears upon the upper end of a flange M mounted upon said cover and which serves to limit the downward movement of the screw-shaft into the receptacle A.

Ice cream or other frozen viands may be compared to a plastic material such as clay, soap, butter and similar substances which are discharged from receptacles through dies disposed in the mouth portions of delivery spouts as in the manufacture of bricks and hollow tile and formation of cakes of soap, etc., the means employed for discharging such materials varying somewhat but being generally of a nature similar to and the equivalent of the piston and screw-shaft which I have here illustrated. In carrying out my invention I am employing old and well-known mechanism of other arts, and I desire it to be understood that I contemplate changing and varying this part of my apparatus to suit requirements and to attain the greatest efficiency in operation thereof.

My invention comprehends the use of the before described means for discharging plastic material from a cylindrical receptacle in connection with a mold into which the said cream is projected and molded into suitable form, the molding device serving to cut the column of projected cream and deliver a predetermined quantity upon a dish.

The shape and construction of the mold employed may be changed and varied and the specific manner of operating the same may likewise be changed and varied without departing from the invention, the construction herein shown being merely intended to illustrate a suitable embodiment of the invention without limitation to specific details of construction.

Mounted upon the delivery end of the delivery spout G are a pair of opposed guides N constituting the side edge portions of a horizontal plate O extending at either end beyond said spout G, the wall of the latter preferably entering a central opening in the plate O, and being soldered or otherwise secured therein. Adjacent one end said plate O is provided with a similar opening P of equal diameter. Resting upon said plate O and extending at its side edges into said guides N is a plate Q provided adjacent one end with an opening which is adapted to register with the delivery end of the spout G and through which the column of cream is projected into an inverted ice cream cone R of well-known construction, rigidly mounted in said plate Q and is equipped with scrapers S suitably connected with a rotatable member T pivotally mounted in the end wall of said cone. At one end of said plate O adjacent the opening P I provide a removable stop U which is adapted to engage one free end of the plate Q to limit the movement thereof in one direction, said limit of movement being such that the opening in the plate Q which may be said to constitute the mouth of the cone R registers with the opening P in the plate O.

The operation of my said device is as follows: The can or cylinder A containing the piston H disposed at the bottom thereof is primarily filled with ice cream in any well-known manner, the cover being at such time removed in order to facilitate the work. After filling the can said cover B is mounted thereon and secured and the screw-shaft I is then inserted through said cover and through the hub of said piston H. By rotating said screw-shaft I in one direction the piston will obviously be raised thus compressing the contained cream against the cover B and through said delivery spout G into said cone R. A relatively slight movement of said piston H would obviously serve to deliver sufficient cream to fill said cone R and when filled the latter is moved toward the opening P, the column of cream projected through said spout G being thus cut off flush with the upper face of the plate O. As soon as said cone is disposed over said opening P a dish is disposed below the latter and the member T is rotated in order to rotate said scrapers S and thus release the cone of cream from said cone R. The cream drops upon the dish intended to receive the same and said cone R is then returned into the path of the column. This operation is repeated until the can or cylinder A is empty whereupon the same is removed and refilled. The said cylinder A is intended to and obviously must be disposed in a suitable receptacle containing cracked ice and salt or other powerful heat absorbent such for example as the receptacle illustrated and described in my application for Letters Patent Serial No. 442,128, filed July 6, 1908.

My said device is very simple, efficient and sanitary and enables cream to be served with great rapidity and in uniform quantities and shapes.

I claim as my invention:

1. An apparatus of the character described comprising a receptacle, a cover therefor, a discharge pipe carried by said cover, a shaft extending through said receptacle, a disk mounted for longitudinal movement on said shaft, and means for rotating said shaft to actuate said disk and thereby force the contents of the receptacle through said discharge pipe.

2. An apparatus of the character described comprising a receptacle, a cover therefor, a discharge pipe carried by said cover, a shaft extending through said receptacle, a disk mounted for longitudinal movement on said shaft, a mold movable over the delivery end of said discharge pipe and receiving the contents of said receptacle, and means for rotating said shaft to actuate said disk to discharge said contents through said discharge pipe.

3. An apparatus of the character described comprising a receptacle, a cover therefor, a discharge pipe carried by said cover, a shaft extending through said receptacle, a disk mounted for longitudinal movement on said shaft, a mold movable in guides transversely to the axis of the discharge pipe and adapted to be disposed over the delivery end of the latter, and means for rotating said shaft to actuate said disk and force the contents of the receptacle through said discharge pipe into said mold, the latter being adapted to be moved to shear the contents thereof from the column contained in the discharge pipe and deliver the same.

4. An apparatus of the character described comprising a receptacle, a cover therefor, a discharge pipe carried by said cover, a shaft extending through said receptacle, a disk mounted for longitudinal movement on said shaft, means for rotating said shaft to actuate said disk and thereby force the contents of the receptacle through said discharge pipe, and a receptacle movable in guides in a direction transversely to the direction of projection of the contents receiving the latter and subsequently separating the received portion from the body of said contents.

In testimony whereof I have signed my name in the presence of two subscribing witnesses.

CHARLES DOERING, Jr.

Witnesses:
 RUDOLPH WM. LOTZ,
 IRVING COWLES.